Figure 1:
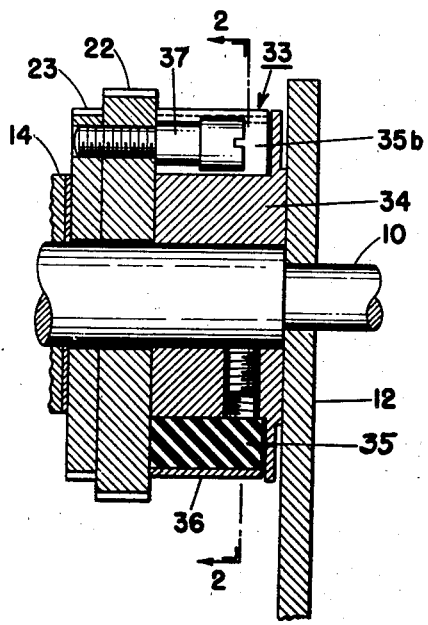

Oct. 15, 1946.　　　　A. A. COLLINS　　　　2,409,192

TUNING DEVICE CLUTCH

Filed April 21, 1943

Inventor
ARTHUR A. COLLINS

By John B. Brady
Attorney

Patented Oct. 15, 1946

2,409,192

UNITED STATES PATENT OFFICE 2,409,192

TUNING DEVICE CLUTCH

Arthur A. Collins, Cedar Rapids, Iowa, assignor to Collins Radio Company, a corporation of Iowa Application April 21, 1943, Serial No. 483,899

2 Claims. (Cl. 64—30)

This invention relates to a tuning device clutch, and more especially to a slip-clutch particularly designed and adapted for use in a device for automatically positioning a tuning shaft in radio apparatus.

Figure 2:
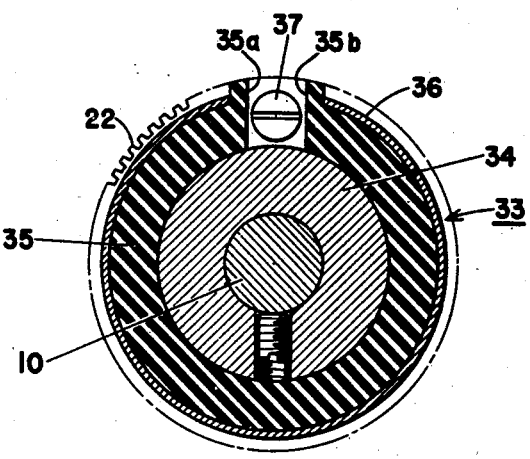

One feature of this invention is that it provides an improved torque-limiting connection between driving and driven shafts in apparatus for automatically positioning the shaft of a radio tuning element; another feature of this invention is that the torque transmissible from the driving to the driven shaft is maintained substantially constant despite wide variations in the coefficient of friction between the engaging friction surfaces, occasioned by variations in temperature, humidity, or the like; still another feature of this invention is that the driving connection is so arranged that resistance of the driven shaft to the driving force tends to reduce the pressure and area of engagement between the cooperating friction surfaces; and yet another feature of this invention is that it provides a highly satisfactory slip-clutch, having several important advantages in automatic shaft positioning apparatus, occupying a minimum of space and capable of convenient manufacture and assembly. Other features and advantages of this invention will be apparent from the following specification and the drawing, in which:

Figure 1 is a partial vertical sectional view through the clutch; and Fig. 2 is a transverse sectional view of the clutch, along the line 2—2 of Figure 1.

I having developed and am here disclosing and claiming a slip-clutch consisting of a minimum number of parts, occupying small space, and easily manufactured and assembled, yet one which has proved to be particularly adapted for use in automatic tuning apparatus. The driving arrangement is such that the transmissible torque is substantially entirely a function of a spring, rather than of varying inter-surface coefficients, so that the desired amount of torque is always available, yet the maximum desired torque is not exceeded. In addition, there is a loose or lost motion driving connection, which in combination with an arrangement providing for a diminishing of the frictional engagement between two cooperating parts upon undue resistance, provides an action which will jar loose and start rotation of shafts when they would otherwise stick. In general, the improved clutch comprises a drum, a friction unit or shoe substantially encircling the drum and normally spring pressed or contracted thereagainst, and driving means including a portion which is a loose fit between the ends of such shoe and arranged to abut against one or the other end in such direction as to oppose the normal contraction of the shoe upon the drum.

It is necessary to at least briefly describe the construction and operation of the shaft positioning unit with which the clutch of my invention is intended to coact in order to bring out the arrangement, connections, and operation of the clutch which is the particular subject matter of this application, and to bring out the structural environment in which the clutch has proved so advantageous. The clutch of my invention is employed in a shaft positioning unit of the type illustrated in my Patent No. 2,285,414, and in my copending application Serial No. 472,717, filed January 18, 1943, and in the copending application of one Richard W. May, Serial No. 515,250, filed December 22, 1943. The way in which a number of such units can be associated to simultaneously tune various shafts of a radio, the drive means therefor, and an operative electric circuit for effecting the desired sequence of operations, have been fully shown in my aforementioned patent, and accordingly have not been illustrated here.

The clutch comprises a drum 34 rigidly mounted on the shaft 18, the drum providing an external annular friction surface. An arcuate friction shoe 35 of Bakelite or other non-metallic material surrounds the drum and has its inner surface in engagement therewith, this shoe being nearly but not quite a full circle, its ends 35a and 35b being spaced. An arcuate flat metal spring 36 encircles the shoe and operates to contract it upon the drum with a predetermined force.

The gear 22 has a driving portion rigidly mounted thereon, here shown as the stud 37, lying between the ends 35a and 35b of the friction shoe. This stud is preferably a loose fit in the space between the ends of the shoe, so that any wear occurring in the clutch which would tend to bring the ends of the shoe together will not make the clutch inoperative. As will be best seen from a consideration of Fig. 2, rotation of the stud 37 in a clockwise direction by the drive means causes it to abut the end 35b, and force transmitted from the stud to this end of the friction shoe tends to lift this end away from the drum.

It will thus be apparent that the action of the drive on the arcuate friction shoe is what may be termed the "unwrapping" type as constrasted with a "servo" action which would tend to cause the friction shoe to wrap more tightly on the drum as force is applied. Variations in temperature, humidity, or the like causing variations in the coefficient of friction between the shoe and the drum are compensated for by this "unwrapping" action. If the coefficient of friction is relatively low, the drive action may cause separation between only a relatively small portion of the friction shoe and the drum (say 30°) before the frictional resistance to slipping and the force of the spring are equal and the clutch slips. On the other hand, if the coefficient of friction between the surfaces is high, a larger amount of shoe is "unwrapped" or separated from contact with the drum (as 180° or more), until the frictional resistance created by the remaining area equals the force of the spring 36, whereupon the clutch again slips, the force transmitted being substantially the same in each case.

The following approximate relations illustrate the operation of the clutch. If $t_1$ is the force of the spring exerted at the two ends of the Bakelite ring, the force $p$ (where $p$ multiplied by the radius of the clutch drum is the transmitted torque) is equal to $t_1 - t_2$ where $t_2$ is the resultant force exerted on the one end of the Bakelite ring by the transmitted force and the spring. At the point of slipping, the following relation is approximately true:

$$\frac{t_1}{t_2} = e^{f\theta}$$

Where $e$ is 2.718, $f$ is the coefficient of friction between the Bakelite ring and the clutch drum, and $\theta$ is the arc of contact of the Bakelite ring on the clutch drum.

Thus $$p = t_1 - \frac{t_1}{e^{f\theta}} = (1 - e^{-f\theta}) t_1$$

If $\theta$ is assumed approximately 2 pi radians (the friction shoe closely approaches a full circle), and $f$ is assumed to have a value of .25 to .5 (a representative range for metal Bakelite contact), the transmitted torque is found to vary only about 20% for this 2 to 1 variation in the coefficient of friction.

If the clutch torque depended entirely on a uniform radial force of the Bakelite ring on the drum (assuming a rigid shoe with no wrapping or unwrapping action), the transmitted torque would vary 2 to 1 for a 2 to 1 variation in the coefficient of friction. Since the Bakelite has considerable rigidity, the clutch described does not conform exactly to the above formula; but the conformance is close.

It will thus be apparent that the point of slippage, the torque transmissible, is substantially entirely a function of the spring 36, rather than varying in accordance with the coefficient of friction at any given instant between the metal drum and the Bakelite shoe. Moreover, the tendency of the friction shoe to bring a larger area into engagement and increase the frictional resistance as soon as slipping starts, causes an action which is very effective in starting rotation of the tuning shaft even if excessive humidity or other conditions have caused corrosion of its bearings or sticking for any other reason.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a torque-limiting clutch, a shaft, a metal drum on said shaft, a non-metallic friction shoe substantially encircling said drum, the ends of said shoe terminating in projecting portions adjacent each other but spaced apart, an arcuate metal spring encircling said shoe and abutting with the projecting portions of said shoe for contracting said shoe about the drum and driving means rotatable about an axis concentric with that of the drum, said last mentioned means having a portion intermediate the ends of said shoe and a loose fit therebetween, said portion being adapted to abut against either of said ends for driving association therewith, whereby the driving force opposes the contraction of said shoe.

2. In a torque limiting clutch, a shaft, a metallic drum secured to said shaft, a non-metallic friction shoe substantially surrounding said drum, the ends of said non-metallic friction shoe having radially extending projections thereon having substantially parallel spaced end faces, an arcuate shaped metallic band spring encircling said non-metallic friction shoe with the ends thereof abutting the radially extending projections of said non-metallic friction shoe and operating to continuously contract said shoe about said drum, and driving means rotatable about an axis concentric with the axis of said drum, said driving means having a member extending between the substantially parallel spaced end faces of said non-metallic friction shoe with appreciable displacement therebetween whereby said member is adapted to abut against either of said end faces for driving association therewith for impressing driving forces upon said shoe opposing the contraction of said shoe with respect to said drum.

ARTHUR A. COLLINS.